US010355514B2

(12) United States Patent
Terry et al.

(10) Patent No.: US 10,355,514 B2
(45) Date of Patent: Jul. 16, 2019

(54) RECTIFIER ARBITRATION IN WIRELESS CHARGING SYSTEMS

(71) Applicant: Apple Inc., Cupertino, CA (US)

(72) Inventors: Stephen C. Terry, Sunnyvale, CA (US); Nilay D. Jani, San Jose, CA (US); Bin Gu, Sunnyvale, CA (US); Yongxuan Hu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 15/485,078

(22) Filed: Apr. 11, 2017

(65) Prior Publication Data

US 2018/0062416 A1 Mar. 1, 2018

Related U.S. Application Data

(60) Provisional application No. 62/380,832, filed on Aug. 29, 2016.

(51) Int. Cl.

| H02M 7/00 | (2006.01) |
|---|---|
| H02J 7/02 | (2016.01) |
| H02M 7/32 | (2006.01) |
| H02M 7/40 | (2006.01) |
| H02J 50/10 | (2016.01) |
| H02J 50/40 | (2016.01) |
| H02J 7/04 | (2006.01) |

(52) U.S. Cl.
CPC ............ *H02J 7/025* (2013.01); *H02J 7/045* (2013.01); *H02J 50/10* (2016.02); *H02J 50/40* (2016.02); *H02M 7/32* (2013.01); *H02M 7/40* (2013.01)

(58) Field of Classification Search
CPC . H02J 50/00; H04B 5/00; H02M 7/32; H02M 7/40
USPC .............................. 307/104, 82, 85
See application file for complete search history.

(56) References Cited

U.S. PATENT DOCUMENTS

| 6,542,023 B1 * | 4/2003 | Daun-Lindberg ... H03K 17/735 307/85 |
| 6,630,753 B2 * | 10/2003 | Malik ..................... H02J 9/061 307/64 |
| 8,653,695 B2 * | 2/2014 | Chang ....................... H02J 1/10 307/80 |
| 9,088,222 B2 | 7/2015 | Irish |

(Continued)

FOREIGN PATENT DOCUMENTS

WO 2012104270 8/2012

*Primary Examiner* — Adi Amrany
(74) *Attorney, Agent, or Firm* — Treyz Law Group, P.C.; Joseph F. Guihan

(57) ABSTRACT

A wireless power transmitting device may transmit power wirelessly to a wireless power receiving device. The wireless power receiving device may be a portable electronic device with an array of wireless power receiving coils that receive wireless power from wireless power transmitting coils in the wireless power transmitting device. Each receiving coil in the array of wireless power receiving coils may be coupled to a respective rectifier. Control circuitry of the wireless power receiving device may be configured to determine which rectifiers to enable for synchronous rectification. The control circuitry may be configured to enable at least one rectifier based on the alternating-current voltages produced by each coil in the array of receiving coils. The control circuitry may also be configured to enable at least one rectifier based on the output current from each rectifier.

8 Claims, 8 Drawing Sheets

(56) References Cited

U.S. PATENT DOCUMENTS

| | | |
|---|---|---|
| 9,209,627 B2 | 12/2015 | Barrman et al. |
| 2003/0090158 A1* | 5/2003 | Fauh .................. H02J 1/08 307/87 |
| 2004/0125621 A1* | 7/2004 | Yang ............. H02M 3/33592 363/21.14 |
| 2005/0068009 A1* | 3/2005 | Aoki ..................... G05F 1/70 323/205 |
| 2008/0068132 A1* | 3/2008 | Kayanakis ......... H04B 5/0062 340/10.1 |
| 2008/0298100 A1 | 12/2008 | Esaka et al. |
| 2012/0306282 A1* | 12/2012 | Tan ...................... H02J 5/005 307/104 |
| 2013/0043734 A1* | 2/2013 | Stone .................. H04B 5/0037 307/104 |
| 2013/0235632 A1* | 9/2013 | Knoedgen ............ H02M 7/06 363/126 |
| 2014/0327390 A1* | 11/2014 | Park ..................... H02J 7/025 320/108 |
| 2014/0347903 A1 | 11/2014 | Ritchey et al. |
| 2014/0368052 A1* | 12/2014 | Norconk ........... H02M 3/3384 307/104 |
| 2015/0028803 A1 | 1/2015 | Shevde et al. |
| 2015/0108843 A1 | 4/2015 | Pietsch et al. |
| 2015/0108847 A1* | 4/2015 | Taylor ................. H02J 50/12 307/104 |
| 2015/0146466 A1* | 5/2015 | Kim .................... H02M 7/219 363/127 |
| 2015/0215006 A1* | 7/2015 | Mehas ............... H04B 5/0037 307/104 |
| 2015/0244176 A1* | 8/2015 | Van Den Brink ...... H02J 5/005 307/104 |
| 2015/0311706 A1* | 10/2015 | Noguchi ............... H02J 1/102 307/52 |
| 2015/0349538 A1* | 12/2015 | Agostinelli ........... H02J 50/12 307/104 |
| 2015/0349849 A1* | 12/2015 | Joehren ................ H04L 27/06 455/41.1 |
| 2016/0190854 A1 | 6/2016 | Woo |
| 2016/0226296 A1* | 8/2016 | Bae ......................... H02J 5/00 |
| 2017/0001003 A1* | 1/2017 | Pivonka .............. A61B 5/6871 |
| 2017/0149291 A1* | 5/2017 | Iwasaki ................ H02J 50/12 |
| 2017/0264141 A1* | 9/2017 | Von Novak, III ... H02J 50/50 |
| 2018/0013310 A1* | 1/2018 | Moussaoui ........... H02J 50/40 |

\* cited by examiner

RECTIFIER ARBITRATION IN WIRELESS CHARGING SYSTEMS

This application claims the benefit of provisional patent application No. 62/380,832, filed Aug. 29, 2016, which is hereby incorporated by reference herein in its entirety.

FIELD

This relates generally to charging systems that use inductive power, and, more particularly, to wireless power receiving devices in charging systems that include rectification circuitry.

BACKGROUND

In a wireless charging system, a power transmitting device may wirelessly transmit power to a power receiving device such as a portable electronic device. A portable device may have a receiving coil and rectifier circuitry for receiving wireless alternating-current (AC) power from a coil in the power transmitting device that is overlapped by the receiving coil. The rectifier converts the received AC power into direct-current (DC) power.

It can be challenging to effectively transmit power from a power transmitting device to a power receiving device. If care is not taken, the wireless charging system may not be sufficiently flexible and power may not be effectively transmitted in some circumstances.

SUMMARY

A wireless power transmitting device may transmit power wirelessly to a wireless power receiving device. The wireless power transmitting device may be a wireless charging mat or other equipment with an array of wireless power transmitting coils. The wireless power receiving device may be a portable electronic device with a battery, an array of wireless power receiving coils that receive wireless power from the array of wireless power transmitting coils, and rectifiers that receive alternating-current signals from the wireless power receiving coils and provide a corresponding rectified direct-current voltage signal to circuitry in the wireless power receiving device.

Each receiving coil in the array of wireless power receiving coils may be coupled to a respective rectifier. Each rectifier may be coupled to a common rectifier output node. The control circuitry of the wireless power receiving device may be configured to determine which rectifiers to enable for synchronous rectification.

The control circuitry may be configured to enable at least one rectifier based on the alternating-current voltages produced by each coil in the array of receiving coils. The alternating-current voltages produced by each coil may be relied upon to determine which rectifier to enable during power-up of the power receiving circuitry in the wireless power receiving device.

The control circuitry may also be configured to enable at least one rectifier based on the output current from each rectifier. The control circuitry may measure an output current from each rectifier and enable that rectifier if the output current is greater than a threshold. The output currents of the rectifiers may be relied upon to determine which rectifiers to enable during power transfer.

DETAILED DESCRIPTION

A wireless power system may have a wireless power transmitting device such as a wireless power adapter or other wireless power transmitting equipment. The wireless power transmitting device may wirelessly transmit power to a wireless power receiving device such as a wristwatch, cellular telephone, tablet computer, laptop computer, or other electronic equipment. The wireless power receiving device may use power from the wireless power transmitting device for powering the device and for charging an internal battery.

Figure 1:
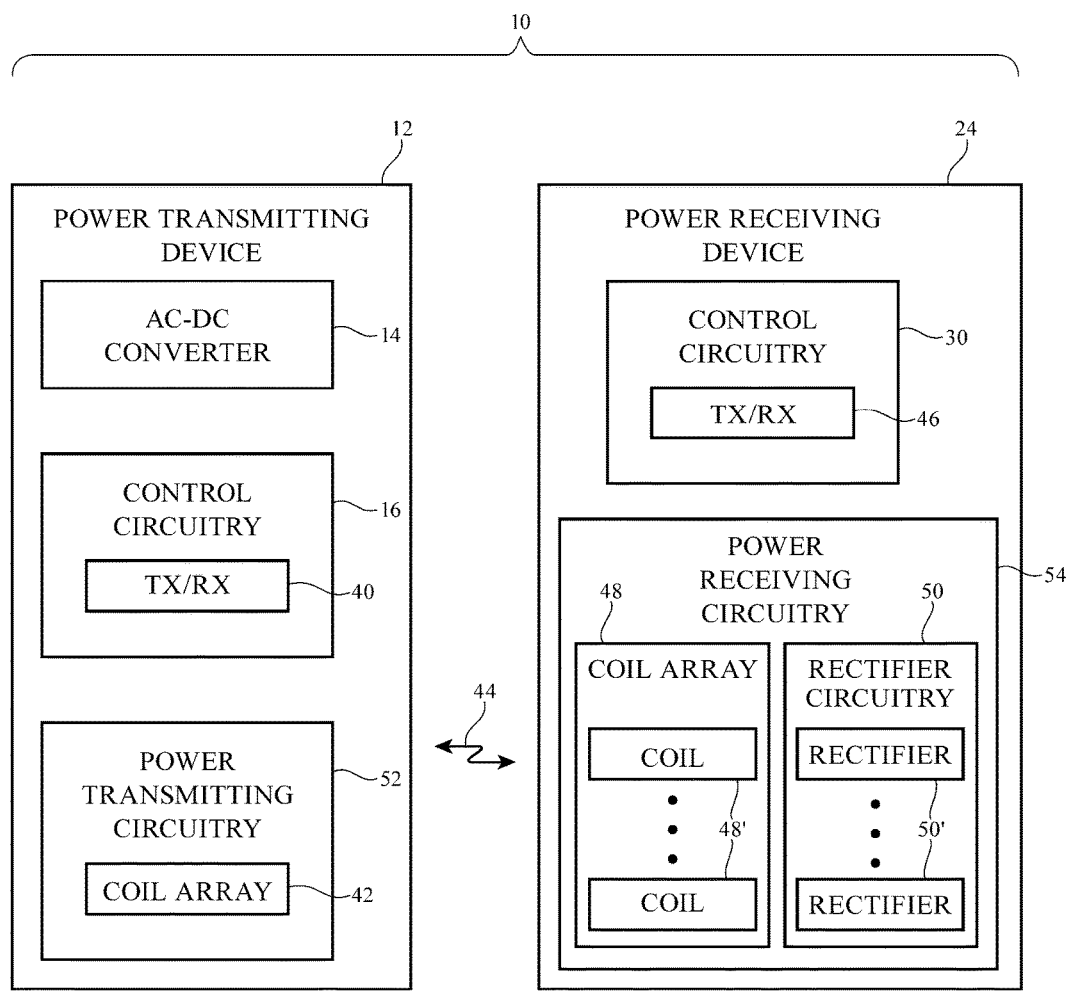
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 10 may include a wireless power transmitting device such as wireless power transmitting device 12 and may include a wireless power receiving device such as wireless power receiving device 24.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment.

Power receiving device 24 may be a portable electronic device such as a wristwatch, a cellular telephone, a laptop computer, a tablet computer, or other electronic equipment. Power transmitting device 12 may be coupled to a wall outlet (e.g., alternating current), may have a battery for supplying power, and/or may have another source of power. Power transmitting device 12 may have an AC-DC power converter such as power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., transistors) that are turned on and off based on control signals provided by control circuitry 16 to create AC current signals through one or more coils in coil array 42. As the AC currents pass through coil array 42, alternating-current magnetic fields (signals 44) are produced that are received by coils 48' in corresponding coil array 48 in power receiving device 24. When the alternating-current magnetic fields are received by the coil array, corresponding alternating-current voltages are induced in the coil array. Rectifier circuitry 50 may convert received AC signals (received alternating-current voltages associated with wireless power signals) from coil array 48 into DC voltage signals for powering device 24. Each coil 48' may have a corresponding rectifier 50' that is used to convert the received AC signals into DC voltage signals. The DC voltages may be used in powering components in device 24 such as a display, touch sensor components, wireless circuits, audio components, and other components and may be used in charging an internal battery in device 24.

Device 12 and/or device 24 may communicate wirelessly using in-band or out-of-band communications. Device 12 may, for example, have wireless transceiver circuitry 40 that wirelessly transmits out-of-band signals to device 24 using an antenna or that wirelessly transmits in-band signals to device 24 using coil array 42. Wireless transceiver circuitry 40 may be used to wirelessly receive out-of-band signals from device 24 using the antenna or may be used to wirelessly receive in-band signals from device 24 using coil array 42. Device 24 may have wireless transceiver circuitry 46 that transmits out-of-band signals to device 12 using an antenna or that transmits in-band signals to device 12 using coil array 48. Receiver circuitry in wireless transceiver 46 may use an antenna to receive in-band signals from device 12 or may use coil array 48 to receive in-band signals from device 12.

During power transmission operations, one or more coil 48' may supply received AC voltages (i.e., receive wireless power signals) to a corresponding rectifier 50'. Each rectifier 50' contains rectifying components such as synchronous rectification metal-oxide-semiconductor transistors arranged in a bridge network. Other configurations are possible for each rectifier 50'. For example, each rectifier 50' may be arranged in a half-bridge or any other desired configuration.

Figure 2:
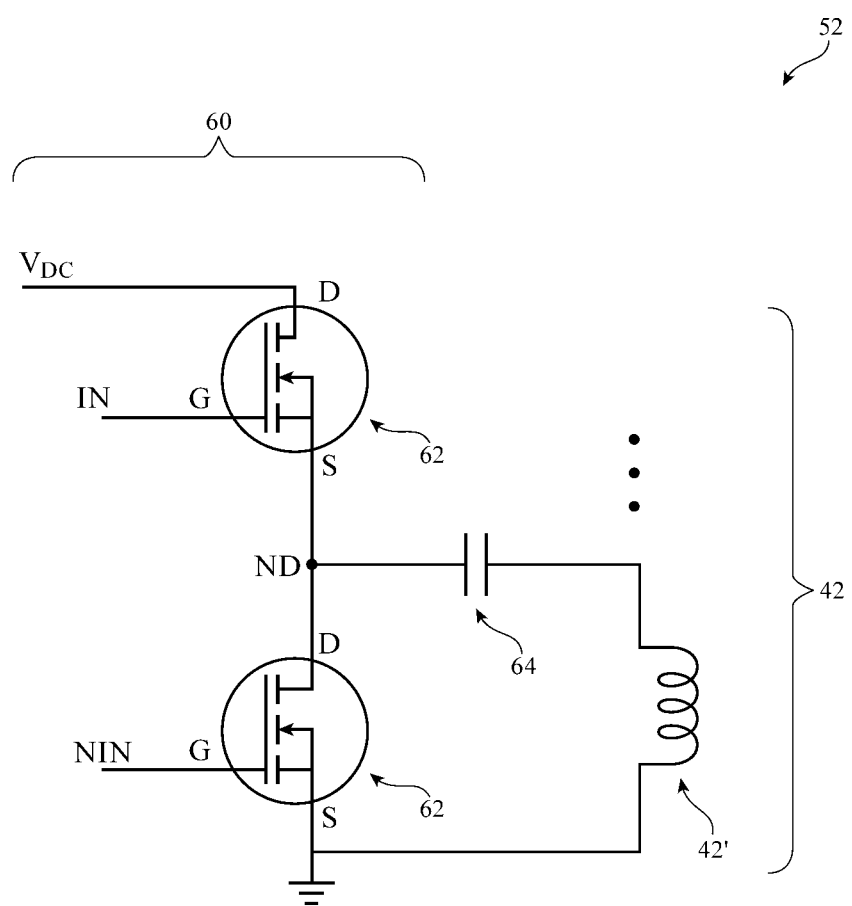
FIG. 2 is a circuit diagram of illustrative wireless power transmitting equipment in accordance with an embodiment.

Illustrative circuitry of the type that may be used for forming power transmitting circuitry 52 of FIG. 1 is shown in FIG. 2. As shown in FIG. 2, power transmitting circuitry 52 may include drive circuitry such as drive circuitry 60 coupled to coils such as coil 42' in coil array 42 (FIG. 1). Drive circuitry 60 may receive direct-current (DC) voltage Vdc from AC-DC converter 14. Drive circuitry 60 may have transistors such as transistors 62 (e.g., metal-oxide-semiconductor transistors or other suitable transistors). Transistors 62 may be coupled in series between a terminal that receives positive power supply voltage Vdc and a ground terminal that receives a ground voltage or any other desired reference voltage. Capacitor 64 may be coupled to node ND between transistors 62. During operation, control circuitry 16 may apply control signals such as control signal IN and complementary (inverted) signal NIN to respective gates G of transistors 62. Control circuitry 16 may modulate signals IN and NIN so that transistors 62 produce an AC drive signal. Capacitor 64 may be used to couple the AC drive signal to a coil such as coil 42' in array 42 that is coupled to transistors 62. As the AC signal flows through coil 42', wireless power signal 44 (FIG. 1) is produced and can be received by coil array 48 of device 24.

In some situations, the wireless power receiving device may include multiple coils and rectifiers to ensure that power can be received when the wireless power receiving device is in different positions relative to the wireless power transmitting device. For example, wireless power transmitting device 12 may include one transmitting coil, while wireless power receiving device 24 may include two or more receiving coils. This type of arrangement increases the likelihood that one of the receiving coils in the wireless power receiving device will receive wireless signals 44 from the transmitting coil (relative to scenarios where only a single receiving coil is used). If the wireless power receiving device is in a first position relative to the wireless power transmitting device, a first receiving coil may receive the wireless signals 44 from the transmitting coil. However, if the wireless power receiving device is in a second position relative to the wireless power transmitting device, a second receiving coil may receive the wireless signals from the transmitting coil.

Figure 3:
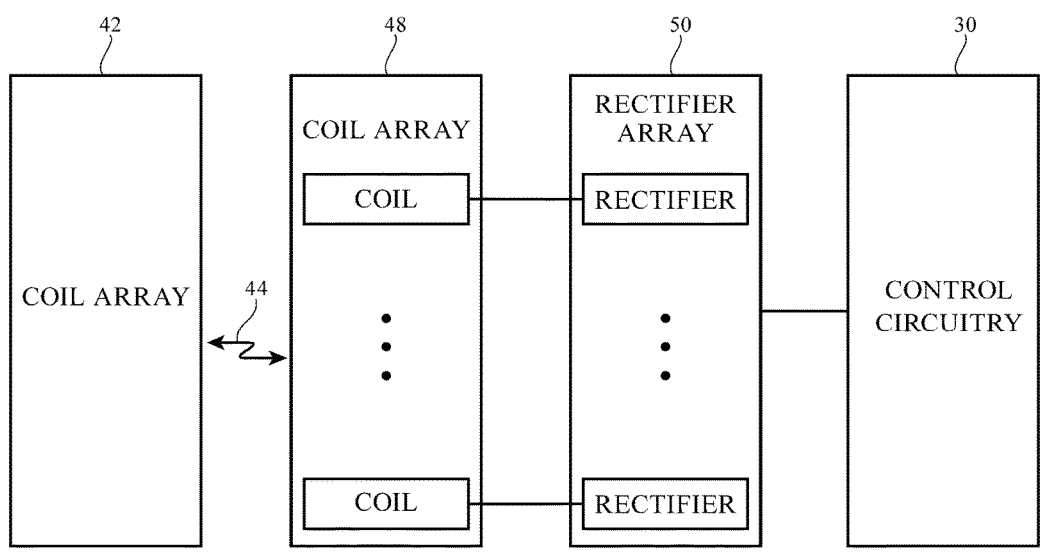
FIG. 3 is a schematic diagram of an illustrative wireless charging system showing how control circuitry may be coupled to rectifier circuitry in accordance with an embodiment.

FIG. 3 shows a schematic diagram of portions of the power transmitting circuitry and power receiving circuitry of a wireless power system such as wireless power system 10 in FIG. 1. Wireless signals 44 may be transmitted from coil array 42 of wireless power transmitting device 12 to coil array 48 of wireless power receiving device 24. As shown, coil array 48 may include multiple coils. Each coil in coil array 48 may be coupled to a respective rectifier in rectifier array 50. Each rectifier may be capable of converting AC signals received by its respective coil into DC voltage signals for powering device 24. However, if a receiving coil in coil array 48 is not receiving wireless signals from coil array 42, it may be desirable to disable that coil's corresponding rectifier. There are a number of ways to determine which rectifiers in rectifier array 50 should be enabled or disabled. In some situations, only one rectifier in the array (e.g., the rectifier that is receiving the most power) may be enabled. In other situations, each rectifier may individually be enabled or disabled depending on the power received by the rectifier. More than one rectifier may be enabled at a time if desired. Control circuitry 30 may be coupled to rectifier circuitry 50 to control the operation of each rectifier. Control circuitry 30 may determine which rectifiers should be enabled and then enable those rectifiers. Similarly, circuitry 30 may determine which rectifiers should be disabled and then disable those rectifiers.

Coils in array 42 and coils in array 48 may be implemented using one or more loops of wire, using one or more loops of metal traces on a printed circuit or other suitable substrate, or may be formed from other looped signal paths. The coils may have circular outlines (footprints when viewed from above), hexagonal outlines, rectangular outlines, polygonal outlines, elliptical outlines, an outline that includes a combination of polygonal and curve shapes, or any other desired shape. The coils may have 1-100 turns, more than 5 turns, more than 15 turns, more than 30 turns, fewer than 75 turns, fewer than 50 turns, or other desired numbers of turns. The coils may have diameters of 5 mm or more, 10 mm or more, 15 mm or more, 20 mm or more, 30 mm or more, 50 mm or more, 100 mm or more, 60 mm or less, 35 mm or less, 5 mm or less, or other desired diameters. The frequency of the AC wireless signals in system 10 (e.g., signals 44) may be 100 kHz to 10 MHz, more than 200 kHz, more than 500 kHz, more than 1 MHz, more than 5 MHz, less than 20 MHz, less than 10 MHz, less than 1 MHz, or other desired frequency.

Figure 4:
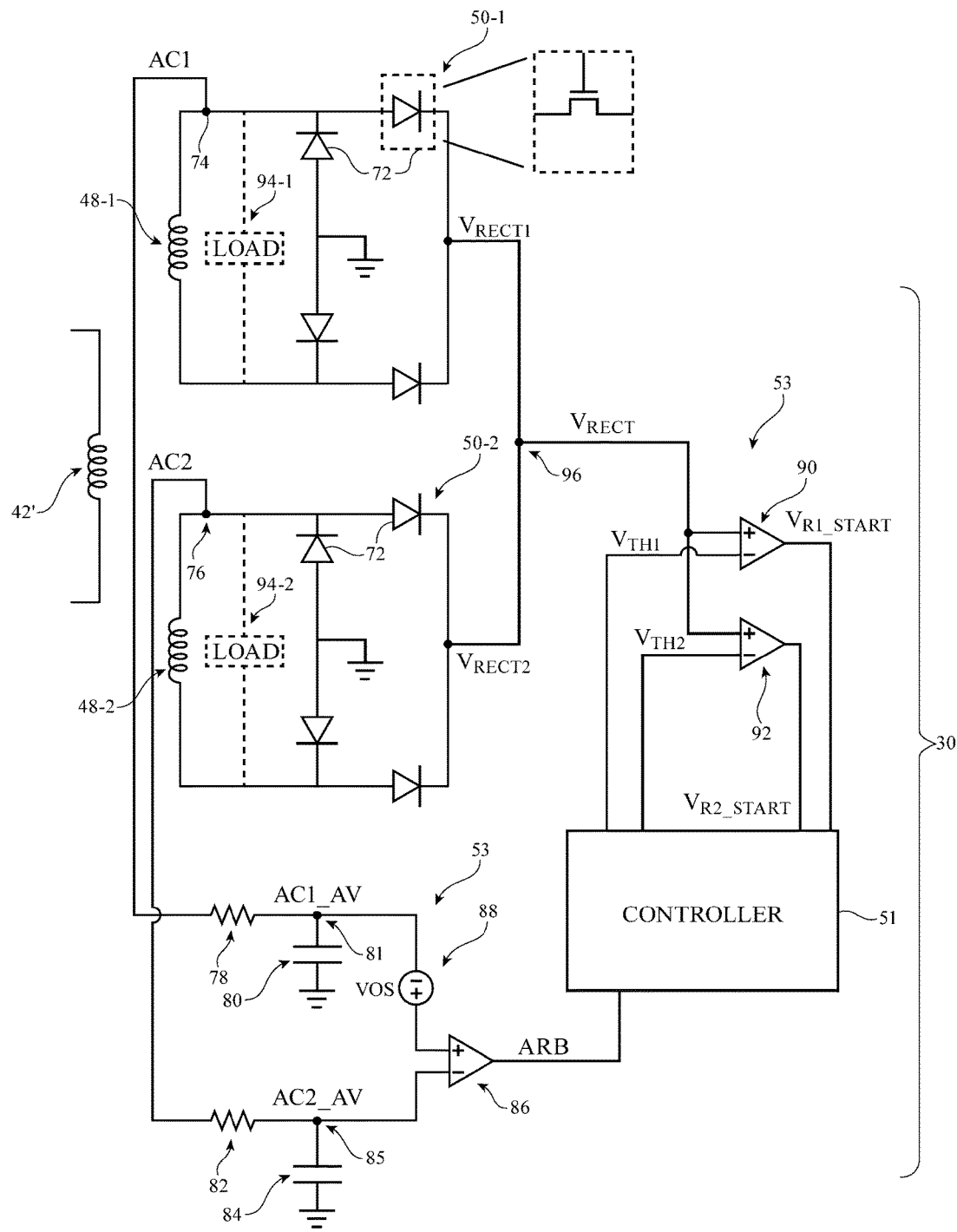
FIG. 4 is a circuit diagram of illustrative circuitry that performs rectifier arbitration based on the AC voltage of each coil in accordance with an embodiment.

FIG. 4 is a circuit diagram showing illustrative circuitry of the type that may be used in implementing power receiving circuitry and control circuitry in a wireless power receiving device. As shown in FIG. 4, the power receiving circuitry may include at least first and second receiving coils 48-1 and 48-2. Each receiving coil may be configured to receive wireless signals from transmitting coil 42'. Each receiving coil may be coupled to a respective rectifier circuit. For example, receiving coil 48-1 may be coupled to rectifier 50-1, whereas receiving coil 48-2 is coupled to rectifier 50-2. As previously discussed, each receiving coil may generate alternating-current voltages in response to alternating-current magnetic fields generated by transmitting coil 42'. Each rectifier may then convert the received AC signals into DC voltage signals (e.g., $V_{RECT1}$ and $V_{RECT2}$) for powering device 24. The rectifiers may be coupled to a common DC output node 96 such that a single DC voltage signal ($V_{RECT}$) is output from the rectifier circuitry.

In general, a rectifier circuit is a circuit that converts alternating current into direct current. There are a number of ways to form a rectifier. In FIG. 4, each rectifier is depicted as having four diodes (72) in a bridge circuit configuration. In some cases, diodes may be used to form each rectifier. However, it may be desirable for the rectifiers to be active rectifiers that perform active rectification. In active rectification (sometimes referred to as synchronous rectification), the diodes of FIG. 4 are replaced with transistors that are controlled by a separate controller. The transistors may be controlled to translate an alternating current into direct current with minimum power loss. The transistors may be transistors with back gate diodes. The transistors may be coupled to comparators and controlled by a controller such as controller 51. When it is desired to enable rectifier 50-1, controller 51 may send an enable signal to the comparator associated with each transistor in rectifier 50-1 such that the transistors are alternately turned on and off in a synchronous rectification scheme. Rectifiers 50-1 and 50-2 in FIG. 4 may include transistors with back gate diodes that are coupled to comparators. Controller 51 may control the transistors of each rectifier. However, for simplicity of the drawing these transistors are represented with the diode circuit diagram symbol in FIG. 4, and the connections between the transistors 72 and controller 51 are not shown. In general, any desired rectifier circuits may be used.

Control circuitry 30 may include controller 51 and rectifier arbitration circuitry 53. Control circuitry 30 may be used to determine whether to enable rectifier 50-1 or 50-2. There may be multiple ways of determining which rectifier to enable depending on the status of the power receiving circuitry. During power-up of power receiving circuitry 54 (when the output load is not yet enabled), voltage measurement may be used to determine which rectifier should be enabled. In other words, the magnitude of voltage produced by coils 48-1 and 48-2 may be compared to determine whether to enable rectifier 50-1 or rectifier 50-2. During power transfer, however, an output current will flow from the rectifiers to an output load (e.g., an internal battery). Consequently, the voltages of each coil may appear to be nearly equal. Therefore, during power transfer the output current of each rectifier may be examined directly to determine which rectifiers should be enabled.

In the example of FIG. 4, rectifier arbitration circuitry uses voltage measurement to determine which rectifier should be enabled during power-up of the power receiving circuitry. As shown, the AC signal produced by coil 48-1 (AC1) may be sampled at node 74. Similarly, the AC signal produced by coil 48-2 (AC2) may be sampled at node 76. The voltages from each coil may be compared by control circuitry 30. Control circuitry 30 may include low-pass filters for each AC signal. For example, resistor 78 and capacitor 80 may form a low-pass filter that filters AC1, whereas resistor 82 and 84 may form a low-pass filter that filters AC2. Resistor 78 may be coupled to node 81, whereas capacitor 80 may be coupled between node 81 and ground. Resistor 82 may be coupled to node 85, whereas capacitor 84 may be coupled between node 85 and ground. Each low-pass filter may attenuate signals with frequencies greater than a selected cutoff frequency. This may reduce noise in the AC signals produced by each coil.

After passing through the low-pass filter formed by resistor 78 and capacitor 80, the voltage at node 81 (AC1_AV) may be considered a representation of the magnitude of the AC signal produced by coil 48-1 (AC1). The voltage at node 85 (AC2_AV) may be considered a representation of the magnitude of the AC signal produced by coil 48-2 (AC2). The magnitude of each AC signal may be determined in a number of different ways. For example, the magnitude of each AC signal may be considered the average voltage of the AC signal for a predetermined time period (such as half of a cycle) or the root-mean squared of the AC signal.

The magnitude of each AC signal may be compared by comparator 86. Comparator 86 may receive voltage AC1_AV at a first input and voltage AC2_AV at a second input. The comparator may compare the magnitude of voltage AC1_AV to the magnitude of voltage AC2_AV. The output of comparator 86 may be an arbitration signal (ARB) that is provided to controller 51. The arbitration signal may have a value indicative of which coil has a higher voltage (e.g., signal ARB may be asserted at a logic high level "1" if AC1_AV is greater than AC2_AV whereas ARB may be provided at a logic low level "0" if AC2_AV is greater than AC1_AV). If desired, an offset voltage source 88 may provide an offset voltage (VOS) that offsets voltage AC1_AV. The offset voltage may have any desired value (i.e., 50 mV, less than 50 mV, greater than 50 mV, between 25 and 75 mV, etc.).

Sampling the AC signals from each coil and determining which coil has a higher voltage may not be the only criteria in selecting a rectifier to enable during power-up. For example, each rectifier may have a respective direct current voltage threshold for selection. Before enabling a rectifier for synchronous rectification, the rectifiers may operate in a passive rectification mode. Accordingly, the rectifiers may produce a DC voltage output ($V_{RECT}$). The DC voltage signal $V_{RECT}$ may be compared to respective threshold values by comparators 90 and 92. For example, comparator 90 may receive $V_{RECT}$ at a first input and a first threshold $V_{TH1}$ at a second input. When $V_{RECT}$ is greater than the threshold $V_{TH1}$, the output from comparator 90 ($V_{R1\_START}$) may be high. When $V_{RECT}$ is less than the threshold $V_{TH1}$, the output from comparator 90 may be low. $V_{TH1}$ may be a predetermined threshold associated with rectifier 50-1. Comparator 92 may receive $V_{RECT}$ at a first input and a second threshold $V_{TH2}$ at a second input. When $V_{RECT}$ is greater than the threshold $V_{TH2}$, the output from comparator 92 ($V_{R2\_START}$) may be high. When $V_{RECT}$ is less than the threshold $V_{TH2}$, the output from comparator 92 may be low. $V_{TH2}$ may be a predetermined threshold associated with rectifier 50-2. $V_{TH1}$ and $V_{TH2}$ may be different threshold voltages or may be the same threshold voltage if desired. Any desired threshold voltage level may be used for each threshold (i.e., 4V, 6V, between 1V and 10V, less than 1V, more than 1V, etc.). The outputs from comparators 90 and 92 may be provided to controller 51. Using ARB, $V_{R1\_START}$, and $V_{R2\_START}$, the controller may determine which rectifier to enable during power-up.

Figure 5:
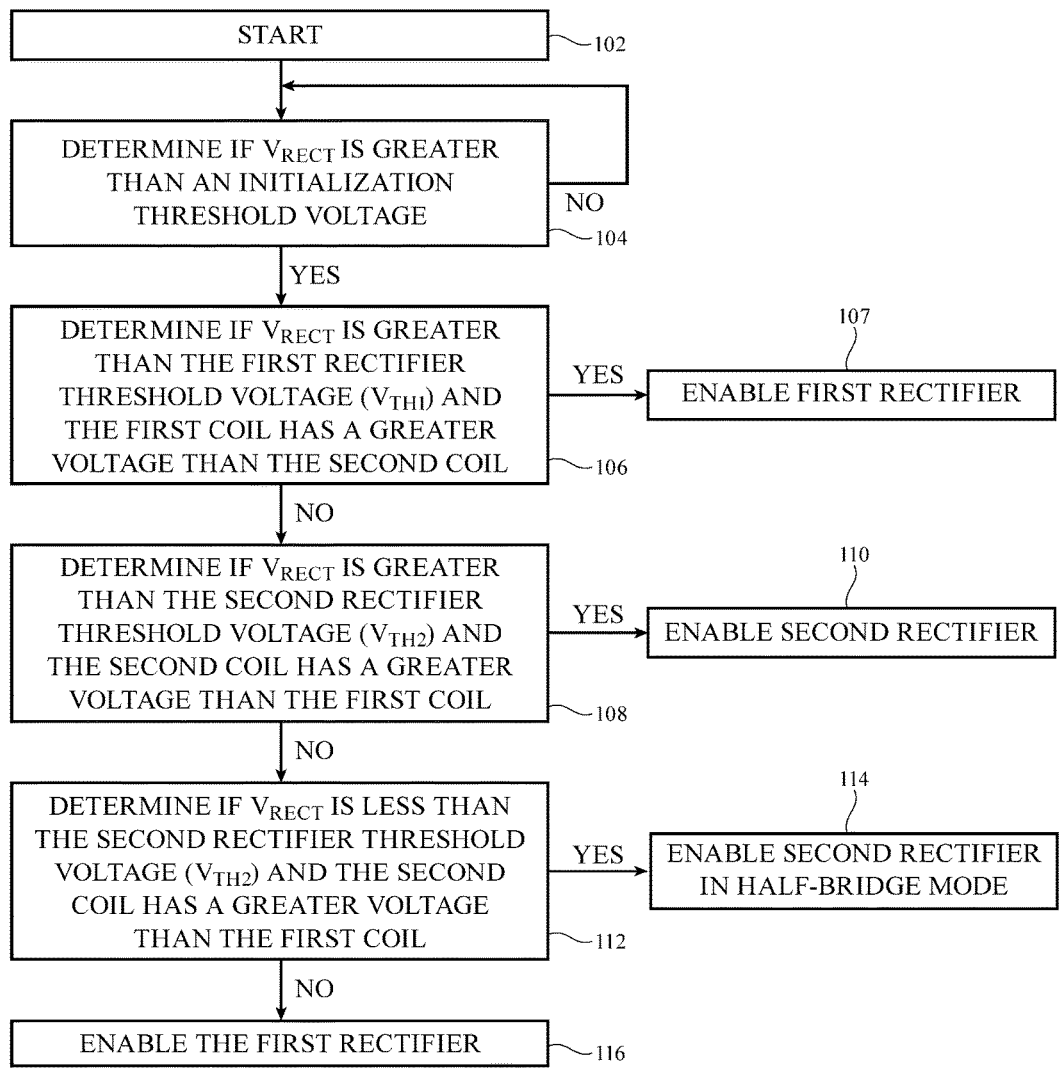
FIG. 5 is a flowchart of illustrative method steps for enabling a rectifier in a wireless charging system during power-up in accordance with an embodiment.

FIG. 5 is a flowchart showing illustrative processing steps for determining which rectifier in FIG. 4 to enable during power-up. These processing steps may be performed by control circuitry 30, for example. At step 102, control circuitry 30 may begin processing operations. At step 104, control circuitry 30 may determine whether $V_{RECT}$ is greater than an initialization threshold voltage. This initialization threshold voltage may be a small predetermined voltage that is used to determine when power is being received by wireless power receiving circuitry 54. The initialization threshold voltage may have any desired value. If it is determined that $V_{RECT}$ is not greater than the initialization threshold voltage, the step may be repeated after some time delay. If it is determined that $V_{RECT}$ is greater than the initialization threshold voltage, the processing may proceed to step 106.

At step 106, control circuitry 30 may be determined whether $V_{RECT}$ is greater than the first rectifier threshold voltage ($V_{TH1}$) and the first coil has a greater voltage than the second coil. If both of these conditions are met, the first rectifier may be enabled at step 107. The conditions of step 106 may ensure that rectifier 50-1 is enabled only if coil 48-1 has a greater voltage than coil 48-2 and $V_{RECT}$ is greater than $V_{TH1}$ (i.e., both ARB and $V_{R1\_START}$ would need to be true for rectifier 50-1 to be enabled at step 107).

If the conditions of step 106 are not met, the processing may proceed to step 108. At step 108, control circuitry 30 may determine whether $V_{RECT}$ is greater than the second rectifier threshold voltage ($V_{TH2}$) and the second coil has a greater voltage than the first coil. If both of these conditions are met, the second rectifier may be enabled at step 110. The conditions of step 108 may ensure that rectifier 50-2 is enabled only if coil 48-2 has a greater voltage than coil 48-1 and $V_{RECT}$ is greater than $V_{TH2}$ (i.e., ARB would need to be false and $V_{R2\_START}$ would need to be true for rectifier 50-2 to be enabled at step 110). If the conditions of step 108 are not met, the processing may proceed to step 112.

At step 112, control circuitry 30 may determine whether $V_{RECT}$ is less than the second rectifier threshold voltage ($V_{TH2}$) and the second coil has a greater voltage than the first coil. If both of these conditions are met, the second rectifier may be enabled in a half-bridge mode at step 114. The conditions of step 112 may ensure that rectifier 50-2 is enabled in the half-bridge mode if coil 48-2 has a greater voltage than coil 48-1 and $V_{RECT}$ is less than $V_{TH2}$ (i.e., both ARB and $V_{R2\_START}$ would need to be false for rectifier 50-2 to be enabled at step 114). In the half-bridge mode, the direct current voltage output of the rectifier may be doubled. To enable half-bridge mode, one of the two low-side transistors in rectifier 50-2 may be turned on to ground one end of the coil, and the two transistors on the other end of the coil may operate synchronously under the control of control circuitry 30. If the conditions of step 112 are not met, the first rectifier may be enabled at step 116. This may be a fail-safe to ensure that at least one rectifier is always enabled during power-up.

The aforementioned operations of device 24 of system 10 may be performed by control circuitry 30. During operation, this control circuitry (which may sometimes be referred to as processing circuitry, processing and storage, computing equipment, a computer, etc.) may be configured to perform the operations of FIG. 5 (e.g., using dedicated hardware and/or using software code running on hardware in system 10 such as control circuitry 30). The software code for performing these methods, which may sometimes be referred to as program instructions, code, data, instructions, or software, may be stored on non-transitory (tangible) computer readable storage media in control circuitry 30 such as read-only memory, random-access memory, hard drive storage, flash drive storage, removable storage medium, or other computer-readable media and may be executed on processing circuitry such as microprocessors and/or application-specific integrated circuits with processing circuits in control circuitry 30.

The example in which the voltage produced by each coil is used to determine which rectifier is enabled during power-up is merely illustrative. If desired, other operations may be performed to determine which rectifier to enable during power-up. As shown in FIG. 4, a load may optionally be connected to each coil in the coil array. Load 94-1 may be coupled to coil 48-1 while load 94-2 may be coupled to coil 48-2. To help determine which rectifier should be enabled, dummy load 94-1 may be applied to coil 48-1 and the corresponding load line may be measured at the common rectifier node 96. Then, dummy load 94-2 may be applied to coil 48-2 and the corresponding load line may be measured at common rectifier node 96. In this way, it may be possible to determine which coil has a higher available power and enable a rectifier accordingly. For example, this method may be most appropriate when the voltages received by each coil are nearly equal at the no-load condition, but the available power from each is different.

Figure 6:
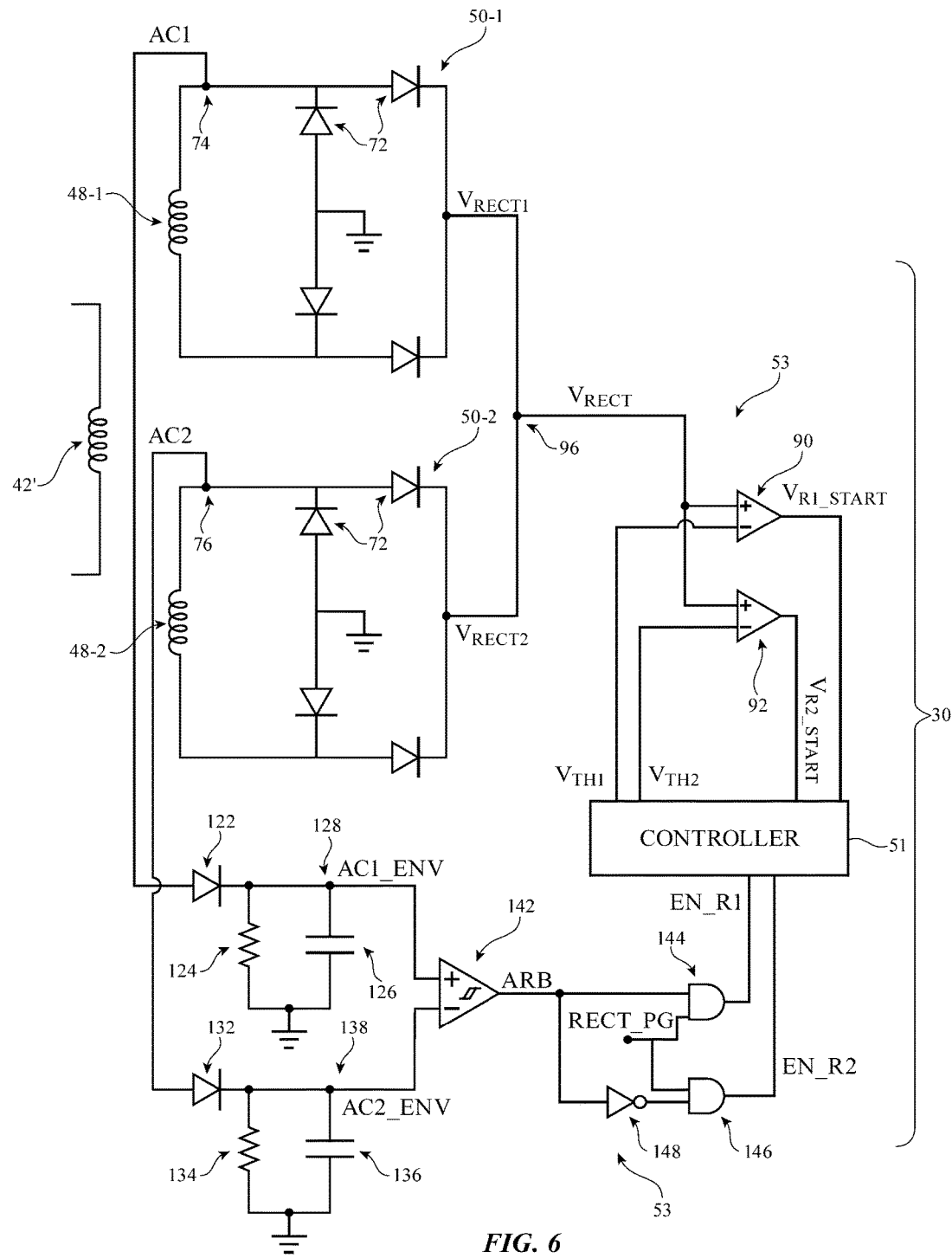
FIG. 6 is a circuit diagram of illustrative circuitry that performs rectifier arbitration based on the envelope signal of the AC voltage of each coil in accordance with an embodiment.

FIG. 6 is a circuit diagram of illustrative rectifier arbitration circuitry that uses the envelope of the voltage from each coil to determine which rectifier should be enabled during power-up of the power receiving circuitry. As shown, the AC voltage from coil 48-1 (AC1) may be sampled at node 74. Diode 122, resistor 124, and capacitor 126 may extract the envelope of signal AC1 received from node 74. Resistor 124 and capacitor 126 may be connected in parallel between diode 122 and ground. The extracted envelope of signal AC1 may be output at node 128 as signal AC1_ENV. The envelope signal (AC1_ENV) may be used to determine the peak voltage of the voltage from coil 48-1. Similarly circuitry may be included to extract the envelope of the AC voltage from coil 48-2 (AC2). As shown, signal AC2 may be sampled at node 76. Diode 132, resistor 134, and capacitor 136 may extract the envelope of signal AC2 received from node 76. Resistor 134 and capacitor 136 may be connected in parallel between diode 132 and ground. The extracted envelope signal of AC2 may be output at node 138 as signal AC2_ENV. The envelope signal (AC2_ENV) may be used to determine the peak voltage of the voltage from coil 48-2.

The envelope signals from each coil (AC1_ENV and AC2_ENV) may then be compared using comparator 142. Comparator 142 may receive AC1_ENV at a first input and AC2_ENV at a second input. The comparator may determine whether a peak magnitude of AC1_ENV or AC2_ENV is greater. Comparator 142 may output an arbitration signal (ARB) that is provided to additional circuitry. The arbitration signal (ARB) may have a value indicative of which coil has a higher peak voltage (i.e., ARB may be high when AC1_ENV is greater than AC2_ENV and ARB may be low when AC2_ENV is greater than AC1_ENV). In one suitable arrangement, comparator 142 may be a Schmitt trigger, which is a comparator with hysteresis. Due to the use of hysteresis, the output of the Schmitt trigger may remain constant until the input changes sufficiently to trigger a change. This may prevent ARB from having high frequency fluctuations to help stabilize the arbitration signal.

In some cases, signal ARB may be provided directly to controller 51 from comparator 142. If desired, ARB may be provided to additional circuitry coupled between comparator 142 and controller 51. As shown in FIG. 6, control circuitry 30 may include logic AND gates 144 and 146 and an inverter 148 coupled between comparator 142 and controller 51. Logic AND gates 144 and 146 may receive a signal (RECT_PG) from controller 51 that is high when $V_{RECT}$ is at a suitable voltage for rectifier arbitration. RECT_PG may therefore ensure that arbitration only occurs when the coils are receiving a suitable amount of power. Logic AND gate 144 may receive signal ARB at a first input and signal RECT_PG at a second input. If both ARB and RECT_PG are high, logic AND gate 144 will assert signal EN_R1 at a logic high level, otherwise EN_R1 is output at a logic low level. Effectively, EN_R1 may be high if the envelope of AC1 is higher than the envelope of AC2 and the RECT_PG signal is high. Logic AND gate 146 may receive an inverted version of signal ARB from inverter 148 at a first input and may receive signal RECT_PG at a second input. If both the inverted version of signal ARB and signal RECT_PG are high, gate 146 may assert signal EN_R2 at a logic high level, otherwise EN_R2 is output at a logic low level. Effectively, EN_R2 may be high if the envelope of AC2 is higher than the envelope of AC1 and the RECT_PG signal is high. EN_R1 and EN_R2 may be provided to controller 51. Controller 51 may enable rectifier 50-1 or 50-2 based on signals EN_R1 and EN_R2. As discussed in connection with FIG. 4, $V_{RECT}$ may be compared to respective thresholds $V_{TH1}$ and $V_{TH2}$ to additionally help decide which rectifier to enable.

The aforementioned embodiments may be used to determine which rectifier to enable during power-up of the power receiving circuitry. However, once power transfer is occurring, an output current will flow to the output load. This may result in the voltages of each coil being nearly equal (i.e., AC1 may be similar to AC2). In these cases, comparing the magnitudes of AC1 and AC2 may be insufficient to determine which rectifier should be enabled. Consequently, additional circuitry may be used to determine which rectifier to enable while power transfer is occurring.

Figure 7:
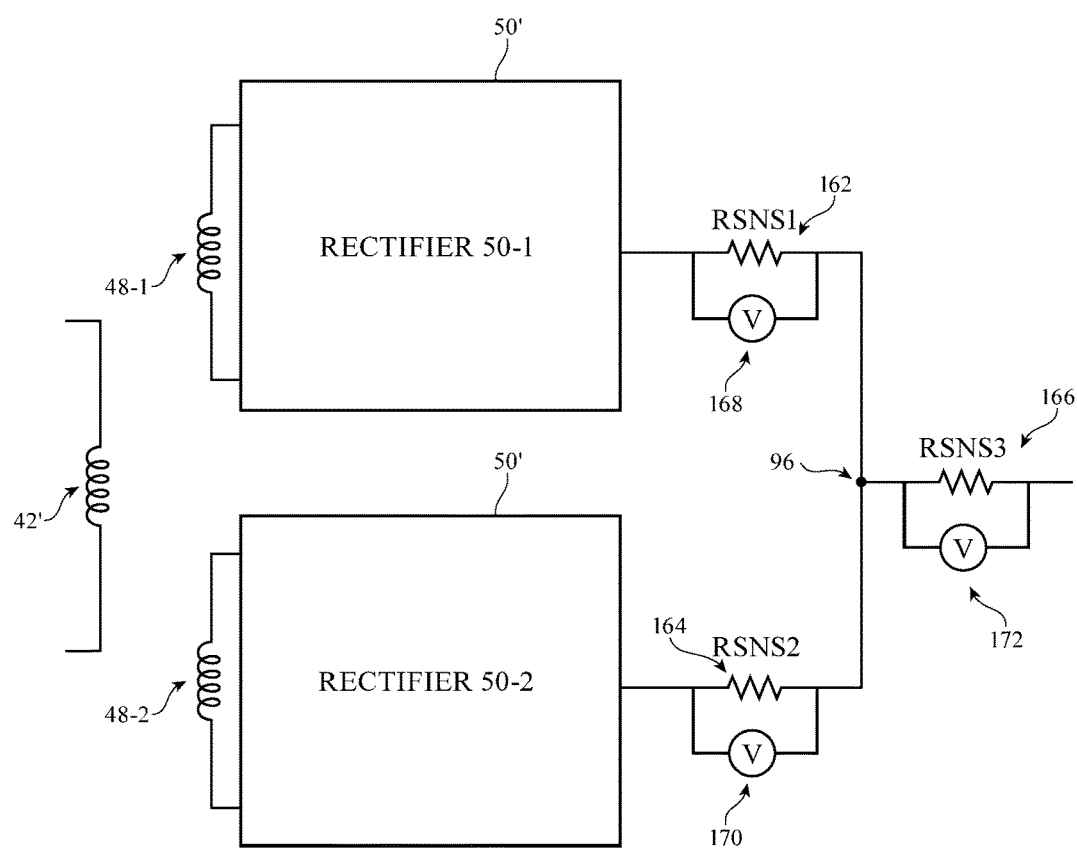
FIG. 7 is a circuit diagram of illustrative circuitry that directly measures the output current from each rectifier to determine which rectifiers to enable and disable during power transfer in accordance with an embodiment.

FIG. 7 is a circuit diagram of illustrative circuitry that may be used to determine which rectifiers to enable during power transfer. It may be desirable to directly measure the output current of each rectifier. The output current of each rectifier may be compared to a predetermined threshold current, and the rectifier may be enabled if the output current is higher than the threshold current. This method has the benefit of enabling both rectifiers to be enabled if both rectifiers are receiving a suitable amount of power.

To determine the output current from each rectifier, various sensing resistors and voltage meters may be included. As shown, a first sensing resistor 162 (RSNS1) may be included to measure the output current from rectifier 50-1. A corresponding voltage meter 168 may be used in conjunction with sensing resistor 162 to determine the output current from rectifier 50-1. The resistor 162 may have a known resistance. Therefore, by determining the voltage drop across the resistor using voltage meter 168, control circuitry 30 may be able to determine the output current from rectifier 50-1 using Ohm's law. The output current may then be compared to a predetermined threshold by control circuitry 30. If the output current from rectifier 50-1 is higher than the predetermined threshold, rectifier 50-1 may be enabled. A second sensing resistor 164 (RSNS2) may be included to measure the output current from rectifier 50-2. A corresponding voltage meter 170 may be used in conjunction with sensing resistor 164 to determine the output current from rectifier 50-2. The output current may then be compared to a predetermined threshold by control circuitry 30. If the output current from rectifier 50-2 is higher than the predetermined threshold, rectifier 50-2 may be enabled.

As shown in FIG. 7, an additional sensing resistor 166 (RSNS3) and corresponding voltage meter 172 may be included that measures the output current from both rectifiers 50-1 and 50-2. Only two of the three sensing resistors shown in FIG. 7 need to be included for the output current of rectifiers 50-1 and 50-2 to be determined. For example, if only sensing resistors 162 and 166 were included, sensing resistor 162 would determine the output current from rectifier 50-1 and sensing resistor 166 would determine the combined output current from rectifier 50-1 and 50-2. The control circuitry could then use these two known currents to solve for the output current from rectifier 50-2. In general, measuring two of the three currents will enable the third current to be calculated. Accordingly, any one of the three sensing transistors shown in FIG. 7 may be omitted without detrimental effects.

The circuitry shown in FIG. 7 for measuring the output currents from rectifiers 50-1 and 50-2 is merely illustrative. In general, any desired circuitry may be used to determine the output currents from rectifiers 50-1 and 50-2. The measured output currents may then be used to determine which rectifiers should be enabled using any desired scheme.

In addition to directly measuring the output currents of the rectifiers, there are other methods that may be used for rectifier arbitration during power transfer. As discussed previously, simply looking at the voltage at each coil may not be sufficient to accurately determine which rectifier should be enabled during power transfer. However, a compensation circuit may be included that mimics the load applied to the unconnected coil such that the voltages from each coil may be compared for rectifier arbitration.

Figure 8:
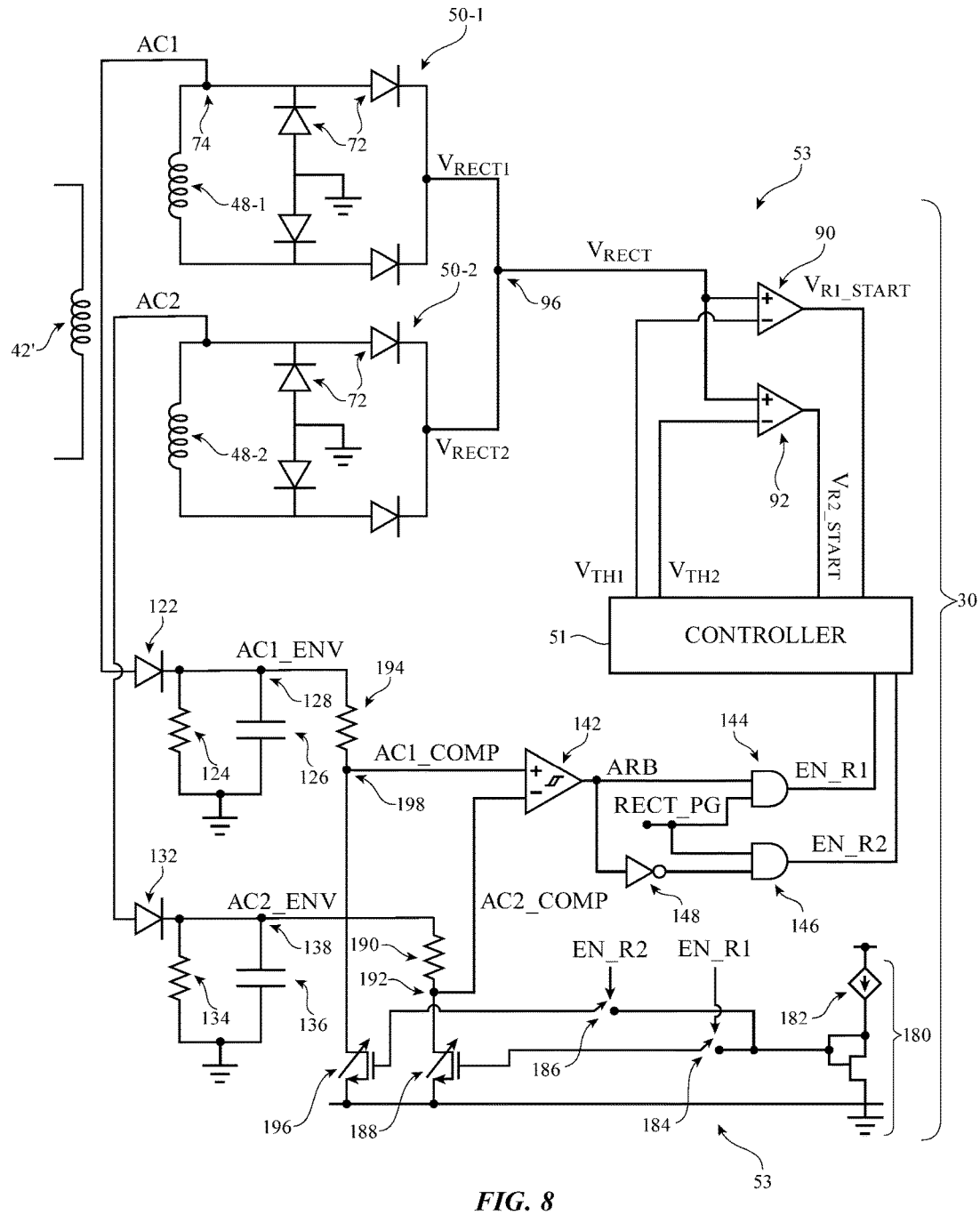
FIG. 8 is a circuit diagram of illustrative circuitry that uses envelope detection and load-line compensation to determine which rectifiers to enable and disable during power transfer in accordance with an embodiment.

FIG. 8 is a circuit diagram of rectifier arbitration circuitry having envelope detection and load-line compensation capabilities. FIG. 8 may have similar circuitry to FIG. 6, with the envelope (AC1_ENV) of the voltage from coil 48-1 (AC1) being determined at node 128 and the envelope (AC2_ENV) of the voltage from coil 48-2 (AC2) being determined at node 138. Additionally, a comparator 142 (which may be a Schmitt trigger) may be included with additional circuitry that generates signals EN_R1 and EN_R2 as described in connection with FIG. 6. However, instead of the inputs of comparator 142 receiving envelope signals AC1_ENV and AC2_ENV, the inputs may receive compensated versions of AC1_ENV and AC2_ENV (AC1_COMP and AC2_COMP respectively).

The compensation circuitry may include a current mirror 180 that uses load current replica 182 to provide a scaled imitation of the load current. The load current may be the output current (at node 96 for example) that is used to power an additional component such as an internal battery. Switches 184 and 186 may be included to ensure that only one coil (e.g., the coil whose rectifier is disabled) is compensated. If signal EN_R1 is high (indicating that rectifier 50-1 is enabled), it may be desirable to compensate the envelope signal from rectifier 50-2. Therefore, switch 184 may be closed when EN_R1 is high and open when EN_R1 is low. If EN_R2 is high (indicating that rectifier 50-2 is enabled), it may be desirable to compensate the envelope signal from rectifier 50-1. Therefore, switch 186 may be closed when EN_R2 is high and open when EN_R2 is low.

When switch 184 is closed, the current mirror may be coupled to the gate of transistor 188 and AC2_ENV may be compensated. Resistor 190 and transistor 188 may be used in combination to replicate the load and compensate AC2_ENV. The compensated signal (AC2_COMP) at node 192 may be used as an input into comparator 142. Resistor 190 and transistor 188 may be tuned so that the load is accurately imitated using the scaled replica from current mirror 180. When switch 186 is closed, the current mirror may be coupled to the gate of transistor 196 and AC1_ENV may be compensated. Resistor 194 and transistor 196 may be used in combination to replicate the load and compensate AC1_ENV. The compensated signal (AC1_COMP) at node 198 may be used as an input into comparator 142. Resistor 194 and transistor 196 may be tuned so that the load is accurately imitated using the scaled replica from current mirror 180.

FIG. 8 shows compensation of the envelopes of the voltages from coils 48-1 and 48-2. However, this example is merely illustrative and compensation circuitry as described in connection with FIG. 8 may be included in other circuits. For example, the circuit shown in FIG. 4 may include compensation circuitry as described in connection with FIG. 8, with AC1_AV and AC2_AV being compensated instead of AC1_ENV and AC2_ENV.

Various embodiments have been described where control circuitry may be used to determine which rectifiers to enable both during power-up, and various embodiments have been described where control circuitry may be used to determine which rectifiers to enable during power transfer. It should be understood that circuitry for rectifier arbitration during both power-up and during power transfer may be included in a single embodiment. As examples, the circuitry of FIG. 4 and the circuitry of FIG. 7 may be included in a single embodiment, or the circuitry of FIG. 6 and the circuitry of FIG. 7 may be included in a single embodiment.

The components of control circuitry 30 and power receiving circuitry 54 described in connection with FIGS. 4, 6, 7, and 8 (i.e., transistors, logic gates, comparators, etc.) may be incorporated into any suitable electronic device or system of electronic devices. For example, the components may be incorporated into a printed circuit board or integrated circuit (IC). Exemplary ICs include programmable array logic (PAL), field programmable logic arrays (FPLAs), application specific standard products (ASSPs), application specific integrated circuits (ASICs), digital signal processors (DSPs), etc. Different components may be incorporated into different devices if desired (i.e., more than one IC may be included). For example, control circuitry 30 and power receiving circuitry 54 may be formed on the same integrated circuit or on different integrated circuits. In another example, different portions of control circuitry 30 may be formed on different integrated circuits, and power receiving circuitry 54 may be formed on yet another integrated circuit.

In the illustrative examples of FIGS. 4, 6, 7, and 8, two receiving coils and two rectifiers are shown. It should be noted that these examples are not meant to be limiting in any way, and more than two receiving coils and rectifiers may be used if desired. In general, any desired number (n) of receiving coils and corresponding rectifiers may be included in the power receiving device.

The foregoing is merely illustrative and various modifications can be made to the described embodiments. The foregoing embodiments may be implemented individually or in any combination.

What is claimed is:

1. An electronic device configured to receive wireless power from a power transmitting device, comprising:
   first and second coils configured to receive alternating-current magnetic signals transmitted from the power transmitting device and configured to produce corresponding alternating-current voltages;
   a first rectifier coupled to the first coil, wherein the first rectifier has transistors configured to rectify the alternating-current voltages from the first coil and produce a corresponding rectified direct-current voltage when active rectification in the first rectifier is enabled;
   a second rectifier coupled to the second coil, wherein the second rectifier has transistors configured to rectify the alternating-current voltages from the second coil and produce a corresponding rectified direct-current voltage when active rectification in the second rectifier is enabled; and
   control circuitry including a comparator that has first and second inputs, wherein a first node between the first coil and the first rectifier is coupled to the first input of the comparator, wherein a second node between the second coil and the second rectifier is coupled to the second input of the comparator, and wherein the control circuitry is configured to enable active rectification in at least one of the first rectifier and the second rectifier based on an output of the comparator.

2. The electronic device defined in claim 1, further comprising a first resistor and a first capacitor, wherein the first resistor is coupled between the first node and the first input of the comparator, wherein the first resistor is coupled to a third node that is interposed between the first node and the first input, and wherein the first capacitor is coupled between the third node and ground.

3. The electronic device defined in claim 2, further comprising a second resistor and a second capacitor, wherein the second resistor is coupled between the second node and the second input of the comparator, wherein the second resistor is coupled to a fourth node that is interposed between the second node and the second input, and wherein the second capacitor is coupled between the fourth node and ground.

4. The electronic device defined in claim 1, wherein the first rectifier and the second rectifier are both coupled to a common rectifier output node, the electronic device further comprising a first additional comparator that has first and second inputs, wherein the common rectifier output node is coupled to the first input of the first additional comparator and wherein a first threshold voltage is provided to the second input of the first additional comparator.

5. The electronic device defined in claim 4, further comprising a second additional comparator that has first and second inputs, wherein the common rectifier output node is coupled to the first input of the second additional comparator and wherein a second threshold voltage is provided to the second input of the second additional comparator.

6. The electronic device defined in claim 1, wherein the first rectifier has an output that is coupled to a common rectifier output node and wherein the second rectifier has an output that is coupled to the common rectifier output node, the electronic device further comprising a first sensing resistor coupled between the output of the first rectifier and the common rectifier node and a first voltage meter that measures a voltage drop across the first sensing resistor in order to measure an output current of the first rectifier.

7. The electronic device defined in claim 6, further comprising a second sensing resistor coupled between the output of the second rectifier and the common rectifier output node and a second voltage meter that measures a voltage drop across the second sensing resistor in order to measure an output current of the second rectifier.

8. The electronic device defined in claim 6, further comprising a second sensing resistor coupled to the common rectifier output node and a second voltage meter that measures a voltage drop across the second sensing resistor in order to measure a combined output current of the first and second rectifiers.

* * * * *